US012647401B2

(12) United States Patent
de Luca

(10) Patent No.: US 12,647,401 B2
(45) Date of Patent: Jun. 2, 2026

(54) HEALTHCARE DATA SYSTEM

(71) Applicant: Roche Diagnostics Operations, Inc., Indianapolis, IN (US)

(72) Inventor: Domenico de Luca, Zurich (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 83 days.

(21) Appl. No.: 18/421,536

(22) Filed: Jan. 24, 2024

(65) Prior Publication Data

US 2024/0406146 A1 Dec. 5, 2024

(30) Foreign Application Priority Data

Jun. 2, 2023 (EP) ..................................... 23155202

(51) Int. Cl.
*H04L 9/40* (2022.01)
(52) U.S. Cl.
CPC ................................ *H04L 63/0428* (2013.01)
(58) Field of Classification Search
CPC .................................................. H04L 63/0428
USPC ......................................................... 713/160
See application file for complete search history.

(56) References Cited

U.S. PATENT DOCUMENTS

| | | | |
|---|---|---|---|
| 9,712,476 B2 * | 7/2017 | Boynton | ............. H04L 63/0272 |
| 2005/0097326 A1 * | 5/2005 | Kim | ...................... H04L 63/123 |
| | | | 713/171 |

| | | | |
|---|---|---|---|
| 2005/0220095 A1 * | 10/2005 | Narayanan | ............ H04L 69/329 |
| | | | 370/389 |
| 2006/0034179 A1 * | 2/2006 | Carter | ..................... H04L 63/08 |
| | | | 370/241 |
| 2008/0075079 A1 * | 3/2008 | Smith | ................... H04L 63/123 |
| | | | 370/392 |
| 2012/0204032 A1 | 8/2012 | Wilkins et al. | |
| 2021/0160213 A1 * | 5/2021 | Dees | ...................... H04L 69/22 |

OTHER PUBLICATIONS

European Search Report issued Jun. 27, 2023, in Application No. 23152502.7, 2 pp.
Gudgin, Martin et al., Soap Version 1.2 W3C Working Draft, Retrieved from http://ww.w3.org/TR/xmlp-scenarios/, 47 pp., 2001.
Yin, Hao et al., A secure multipath routing protocol in mobile ad hoc networks, Concurrency and Computation: Practice and Experience, vol. 22, pp. 481-502, 2010.

* cited by examiner

*Primary Examiner* — Brandon Hoffman
(74) *Attorney, Agent, or Firm* — Lee & Hayes, P.C.

(57) ABSTRACT

A healthcare data system. The system comprises a data protection entity configured to: sign at least a portion of a routing header of a data packet with a private key held by the data protection entity, the data packet including a payload and a routing header, the payload including healthcare data and the routing header indicating an intended consumer of the data packet; and transmit the data packet on towards the intended consumer. The healthcare data system further comprises one or more data receivers, each configured to: receive the data packet; and verify the signed routing header.

20 Claims, 8 Drawing Sheets

HEALTHCARE DATA SYSTEM

CROSS-REFERENCE TO RELATED APPLICATIONS

This application claims priority to European Patent Application No. 23155202.7 filed Feb. 6, 2023, the disclosure of which is hereby incorporated by reference in its entirety.

FIELD OF THE INVENTION

The present invention relates to a healthcare data system, a data protection entity and computer implemented method of protecting healthcare data.

BACKGROUND

As healthcare data system increase in complexity, there is a desire to connect different data sources across networks and send collated data to cloud-based backend entities to process and store the data. This can allow the data to be used by different applications for different purposes.

In some cases, it is desirable to be able to verify the origin of data that is delivered to a recipient entity to ensure that the data has been delivered to the intended recipient for that data and not delivered to the recipient entity due to technical errors within another backend entity within the healthcare data system or the actions of a malicious entity. It may also be desirable to be able to verify the route by which the data has travelled through the healthcare data system before reaching a recipient entity.

Furthermore, where the data sent through the healthcare data management system is encrypted, it is desirable that the system is not dependent on a single entity for the purposes of obtaining encryption and decryption keys for the encrypted data.

The present disclosure has been devised in light of the above considerations.

SUMMARY OF THE INVENTION

In a first aspect there is provided a healthcare data system. The healthcare data system comprises a data protection entity configured to: sign at least a portion of a routing header of a data packet with a private key held by the data protection entity, the data packet including a payload and a routing header, the payload including healthcare data and the routing header indicating an intended consumer of the data packet; and transmit the data packet on towards the intended consumer. The healthcare data system further comprises one or more data receivers, each configured to receive the data packet; and verify the signed routing header.

Advantageously, such a healthcare data system facilitates the avoidance of the data protection entity repudiating the action of having sent the data packet to the data receiver when transmitting the data packet towards the intended consumer, because the signing of at least a portion of the routing header by the data protection entity can be verified by the data receiver. The data protection entity may be implemented as a processor operating under the control of a healthcare data system controller. Alternatively, the data protection entity may be the healthcare data system controller. One or more functions of the data protection entity may be performed by modules external to the data protection entity but under the control thereof.

Transmission of the data packet on towards the intended consumer may not require arrival of the data packet to the intended consumer directly following transmission by the data protection entity and may merely require the data packet to move closer to the intended consumer along a route of data receivers defined by the routing header. In other words, the data receiver may be a processing node or a data consumer. A processing node may execute a processing or pre-processing step on data contained within the payload of the data packet or the routing header of the data packet that the processing node receives. The network may include passive nodes, for example queues, though which the data packet passes. A data consumer is the ultimate user of the data contained within the payload of the data packet, for example an application or user device running an application which intends to utilise (consume) the payload of the data packet. By providing the data packet to one or more data receivers along a route to the intended consumers, data contained within the payload can be pre-processed by the intermediate data receivers prior to being received by the intended consumer However, transmission of the data packet on towards the intended consumer may encompass arrival of the data packet to the intended consumer directly following transmission by the data protection entity.

Where the data receiver is a data consumer, it may be configured to verify the signed routing header using a public key associated with the private key held by the data protection entity. The public key may correspond asymmetrically to the private key used by the data protection entity to sign at least a portion of the routing header. Advantageously, by using an asymmetric key system for signing and verifying the routing header, a public key for verifying the signed routing header can be shared freely within the healthcare data system without encryption, whilst the private key used to sign the routing header remains secret. Accordingly, the data receiver is able to detect if the routing header has been maliciously or erroneously modified.

Public keys may be shared with data receivers within the healthcare data system using X.509 certificates. Alternatively, the public keys may be shared with data receivers within the healthcare data system using a key management service.

The healthcare data system may comprise a plurality of data receivers, one or more of the data receivers being a processing node. Each processing node is configured to receive the data packet from a preceding entity and verify the signed routing header using a public key associated with the preceding entity or a further preceding entity. The preceding entity to a given processing node may be the data protection entity or another processing node within the healthcare data system. The preceding entity may be one immediately preceding the processing node. A further preceding entity may be an entity preceding the processing node but not necessarily immediately preceding. Where the preceding entity to a given processing node is another processing node within the healthcare data system, that other processing node may be configured to re-sign the signed routing header using a private key associated with the given processing node. Accordingly, each processing node is able to verify the chain of transmission of the data packet, such that it is possible for that processing node to detect when the data packet has been transmitted to it from an unauthorised entity or an incorrect entity according to the routing header. In this way, the system can ensure that the data consumer receives the intended data packet having been routed via the intended processing nodes.

Where the healthcare data system comprises a plurality of data receivers, one or more of the data receives being a processing node, one or more given processing nodes may be further configured to modify a portion of the signed routing header, to indicate a next processing node to which the data packet is to be transmitted, and sign the modified portion of the signed routing header using a private key associated with the given processing node. This facilitates dynamic modification of the route along which a data packet is to be transmitted to reach the data consumer, whilst still allowing the routing header to be verified such as to provide the functionality of verifying the chain of transmission of the data packet and avoiding repudiation by the data protection entity or other entities within the healthcare data system.

The routing header may indicate a path through one or more processing nodes contained within the healthcare data system.

The data protection entity may be connected to laboratory middleware and/or a laboratory information system (LIS)/laboratory information management system (LIMS).

The routing header may comprise a source system identifier, a data packet identifier, and a final recipient. The final recipient may be the intended consumer, or a publisher which makes the data packet available to the intended consumer. The routing header may further comprise a next-data-receiver identifier.

The healthcare data system may further comprise a key management service, the key management service being configured to manage one or more security keys. The key management service is separate to the data protection entity. The security keys may include the private key the data protection entity is configured to use to sign a portion of the routing header, and the public key the data receiver (for example the data consumer) is configured to use to verify the signed routing header. Advantageously, the key management service provides a secure means to store the security keys used within the healthcare data system. The key management service may also be configured to generate the security keys used within the healthcare data system. The healthcare data system may be configured such that the key management service is located within a first computer network and the data consumer is located within a second computer network, the first computer network and second computer network being connected across an internet link. Isolation of the key management service from the data protection entity provides the system with additional security. Additionally, the healthcare data system may be configured such that the data protection entity and data consumers are located in different computer networks to each other, the computer networks being connected across an internet link; the data consumers may located in a different computer network to the key management service (i.e. in a third computer network), in which case the computer networks of the data consumer and key management service also being connected across and internet link.

The data protection entity may be further configured to encrypt the payload of the data packet using a data encryption key. Encryption of the payload ensures that data contained within the payload cannot be understood by a malicious entity if intercepted.

Where the payload is encrypted, a decryption key configured to decrypt the encrypted payload may be held by the key management service. The decryption key is accessible by the data consumer upon presentation of a token to the key management service. This provides a system by which the data consumer can decrypt the encrypted payload by having a private token indicating it is authorised to receive the decryption key. The key management server may maintain a group of decryption keys per organisation (for example per health care organisation), with one decryption key used per application. This facilitates both order agreement (applications should only be able to process data for which they have the entitlement/an order clause) and multitenancy.

Where the data consumer has a token for presentation to the key management service, the token may be stored only in volatile memory within the data consumer. Storage in volatile memory enhances the security of the system because the token is only retained by the data consumer as long as the data consumer is receiving power (or is being instantiated as a virtual machine).

The data protection entity may be further configured to sign the at least a portion of the routing header by providing the routing header or at least a portion of the routing header to a one-way function. For example, a hash of the routing header or a portion of the routing header may be computed and signed with the private key. Computing a hash of the routing header allows the routing header to be stored as a fixed-size numeric representation of the contents of the routing header. The hash function may be, for example, a SHA2-256 function.

In a second aspect there is provided a data protection entity, the data protection entity being connectable within a healthcare data system to a data source and a data consumer. The data protection entity is configured to: receive, from the data source, a data packet including a payload; determine a routing header, the routing header indicating the intended consumer of the data packet; sign at least a portion of the routing header with a private key held by the data protection entity; and transmit the data packet on toward the data consumer. Advantageously, such a data protection entity facilitates the avoidance of the data protection entity subsequently repudiating the action of having sent the data packet to the data receiver when transmitting the data packet towards the intended consumer, because the signing of at least a portion of the routing header by the data protection entity can be verified by the data consumer.

The data entity of the second aspect may have any one, or any combination insofar as they are compatible, of the optional features set out with reference to the system of the first aspect.

In a third aspect there is provided a healthcare data consumer configured to receive a data packet from another entity within a healthcare data system, the data packet including a payload and a signed routing header and the healthcare data consumer being further configured to verify the signed routing header. Advantageously, such a data consumer facilitates the avoidance of the other entity within the healthcare data system subsequently repudiating the action of having sent the data packet to the data receiver when transmitting the data packet towards the intended consumer, because the signed router header can be verified as having been signed by that other entity.

The healthcare data consumer may have any one, or any combination insofar as they are compatible, of the optional features set out with reference to the system of the first aspect.

In a fourth aspect there is provided a computer implemented method comprising the steps of: receiving, by a data protection entity, a data packet including a payload and a routing header, the payload including healthcare data and the routing header indicating an intended consumer of the data packet; signing, by the data protection entity, at least a portion of the routing header with a private key held by the data protection entity; and transmitting the data packet on to one or more data receivers, each data receiver: receiving the data packet, and verifying the signed routing header. Advantageously, such a method facilitates the avoidance of the data protection entity subsequently repudiating the step of having transmitted the data packet to the data receivers, because the signing of at least a portion of the routing header by the data protection entity can be verified by the data receiver.

The method of the fourth aspect may have any one, or any combination insofar as they are compatible, of the optional features set out with reference to the system of the first aspect.

The data receiver may be a data consumer, and the method may include the data receiver verifying the signed routing header using a public key associated with the private key held by the data protection entity.

There may be a plurality of data receivers, and one or more of the data receivers may be a processing node. The method may include the or each processing node may: receiving the data packet from a preceding entity; and verifying the signed routing header using a public key associated with the preceding entity or a further preceding entity. The preceding entity may be one immediately preceding the processing node. A further preceding entity may be an entity preceding the processing node but not necessarily immediately preceding. The method may include the one or more processing nodes: modifying a portion of the signed routing header, to indicate a next data receiver to which the data packet is to be transmitted; and signing the modified portion of the signed routing header using a private key associated with the given processing node.

The routing header may indicate an intended path through one or more processing nodes. The data protection entity may be connected to laboratory middleware and/or a laboratory information system (LIS)/laboratory information management system (LIMS). The routing header may include at least: a source system identifier; a data packet identified; and a final recipient. The method may be operable on or using the system of the first aspect. The system may include a key management service, separate from the data protection entity, and which manages one or more security keys. The method may further include the data protection entity encrypting the payload of the data packet using a data encryption key. The decryption key may be usable to decrypt the encrypted payload and may be held by the key management server. The decryption key may be provided to the data consumer upon presentation of a token to the key management server. The data consumer may store the token only in volatile memory. The method may further include the data protection entity signing at least a portion of the routing header by providing the routing header or at least a portion of the routing header to a one-way function. For example, a hash of the routing header or a portion of the routing header may be computed an d signed with the private key.

In a fifth aspect, there is provided a healthcare data system including a data protection entity configured to: receive a data packet, the data packet including a payload which includes healthcare data; encrypt the payload with a private data encryption key; and transmit, toward the data consumer, the data packet with the encrypted payload. The healthcare data system of the fifth aspect further includes a data consumer configured to: provide a token to a key management service and receive a decryption key from the key management service in response; and decrypt the encrypted payload utilising the decryption key. The healthcare data system of the fifth aspect further comprises the key management service, which is separate to the data protection entity and is configured to provide the decryption key to the data consumer in response to receiving the token. The payload encryption may use symmetrical keys, such that the data encryption key can be used as the decryption key. The data encryption key may be an AES 256 GCM key.

The data protection entity of the healthcare data system of the fifth aspect may be further configured to encrypt the private data encryption key and store the encrypted private data encryption key in the data packet, and the data consumer of the healthcare data system of the fifth aspect may be configured to use the decryption key provided by the key management service to decrypt the encrypted private data encryption key, and decrypt the encrypted payload using the decrypted private data encryption key. The data encryption key may be an AES 256 GCM key. The data protection entity may be configured to encrypt the private data encryption key using a key encryption key. The key encryption key may be an AES 256 GCM key. The key encryption may use symmetrical keys, such that the key encryption key can be used as the decryption key to decrypt the encrypted private data encryption key.

Further aspects of the present invention provide: a computer program comprising code which, when run on a computer, causes the computer to perform the method of the fourth aspect; a computer readable storage medium storing a computer program comprising code which, when run on a computer, causes the computer to perform the method of the fourth aspect; and a computer system programmed to perform the method of the fourth aspect.

The invention includes the combination of the aspects and preferred features described except where such a combination is clearly impermissible or expressly avoided.

BRIEF DESCRIPTION OF THE FIGURES

Embodiments of the disclosure will now be described by way of examples with reference to the accompanying figures in which.

DETAILED DESCRIPTION OF THE INVENTION

Aspects and embodiments of the present disclosure will now be discussed with reference to the accompanying figures. Further aspects and embodiments will be apparent to those skilled in the art.

FIG. 1

Figure 1:
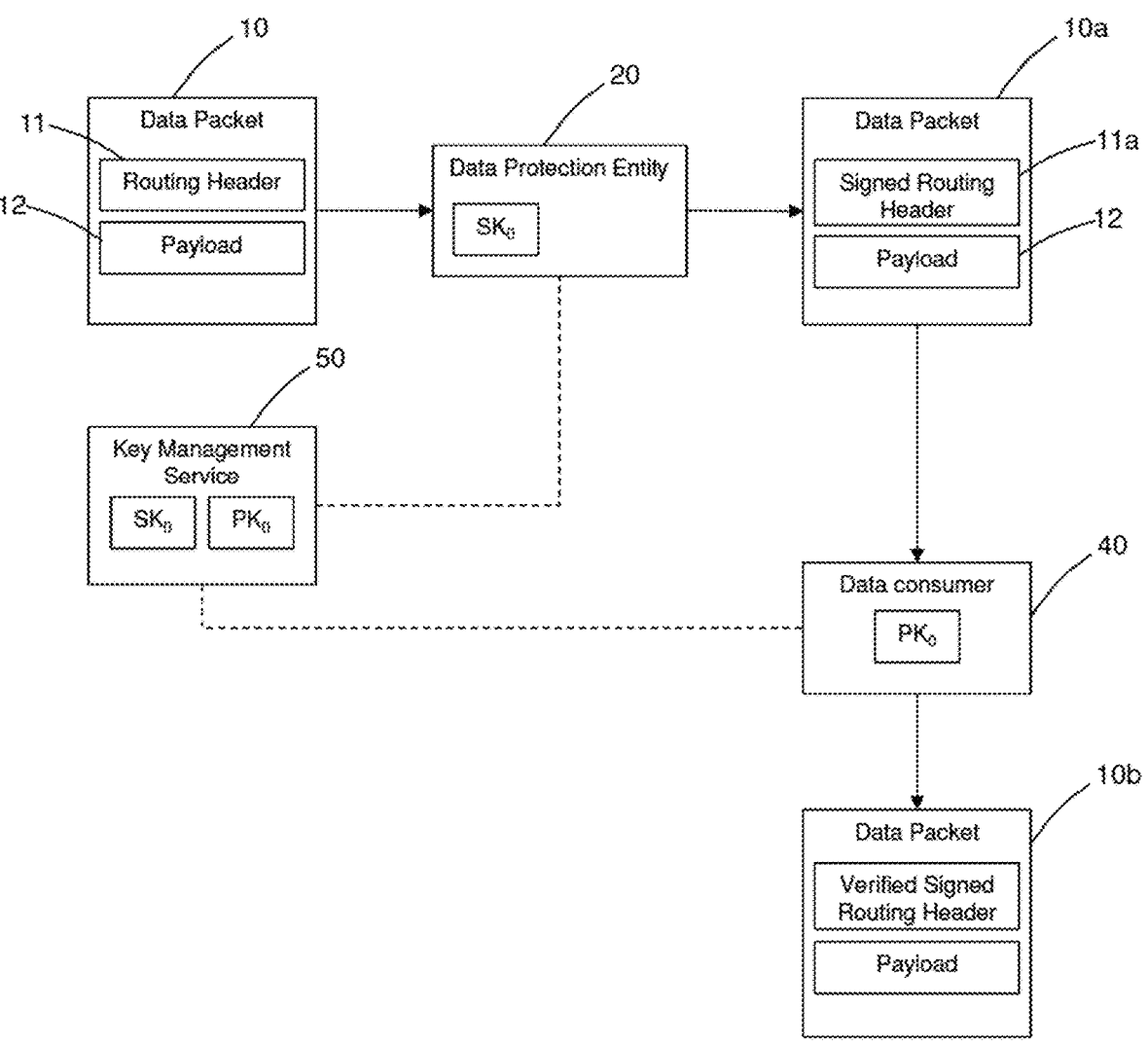
FIG. 1 is an information flow diagram illustrating a healthcare data system according to the first aspect.

FIG. 1 is an information flow diagram illustrating a healthcare data system according to the first aspect. A data packet 10 is present within the healthcare data system. The data packet 10 includes a routing header 11 and a payload 12. The routing header 11 contains metadata relating to the data contained within the data packet 10, including an intended consumer of the data packet, whilst the payload 12 contains the healthcare data to be processed by the healthcare data system. The healthcare data within the payload 12 is data provided by a lab information system or a laboratory instrument.

The healthcare data within the data packet 10 is to be delivered to a data receiver that, in the case of FIG. 1, is a data consumer 40 (i.e. the intended consumer of the healthcare data within the data packet 10, for example to analyse). It is desirable for the data consumer 40 to be able to validate that the data packet 10 it receives has been sent from an authorised entity within the healthcare data system. Accordingly, the data packet 10 is passed to a data protection entity (DPE) 20 within the healthcare data system that is configured to sign at least a portion of the routing header 11 within the data packet 10. In the healthcare data system of FIG. 1, the DPE 20 contains secret key zero ($SK_0$) as the first entity that the data packet is passed to in the system. $SK_0$ is used by the DPE 20 to sign at least a portion of the routing header 11, resulting in a modified data packet 10a having a signed routing header 11a alongside the payload. The DPE 20 is implemented as laboratory middleware. The routing header in some examples contains a plurality of fields, for example: an ID of the header; a source of the header; a specification version; a manufacturer or OEM specification version; a type of header; a generation time of the routing header; and fields pertaining to privacy and content type. The signature is added as an additional field with the label 'signature'. In some examples the signature is a 64-bit hexadecimal character representing a 256-bit digest of an input under a given key. For example: "Signature": "a4d9a1f9d8cab7c6b1d6a7d6f8f6b69f6a5e6d9e6c8f6a7d6f 8f6d9e6c8f6a7d6".

The DPE 20, having signed the routing header 11, is configured to then transmit the data packet 10a on towards the intended consumer that is indicated in the routing header 11: the data consumer 40.

The data consumer 40 is configured to receive the transmitted data packet 10a and verify the signed router header. In order to verify the signed routing header 11a, data packet 10a is provided with public key zero ($PK_0$) that corresponds to $SK_0$ in that the public key has an asymmetric relationship with the private key—$PK_0$ can be used to verify that the signed routing header 11a was signed using $SK_0$, which is not publicly known, and it is not possible to determine $SK_0$ using the signed routing header 11a and $PK_0$. Having verified the signed routing header using $PK_0$, the data consumer 40 knows that the data packet 10b has been signed by the DPE 20 and accordingly the DPE 20 is unable to dispute the association of that data packet 10a with the DPE 20—the healthcare data system is provided with anti-repudiation functionality. If the data consumer is unable to verify the signed routing header 11a using $PK_0$ corresponding to the $SK_0$ of the DPE 20 that the signed routing header purports the data packet to have been transmitted from, then the data packet is discarded by the healthcare data system as having arisen from an unauthorised entity or as a result of an error in the system and no further use of the payload data is made. This failure to verify may be logged.

The healthcare data system of FIG. 1 further includes a key management service (KMS) 50. The KMS 50 is configured to manage one or more security keys (for example, $SK_0$ and $PK_0$) within the healthcare data system, the KMS 50 being (in this example) a separate entity to the DPE 20. The KMS 50 is in networked communication with the DPE 20 and the data consumer 40. Management of the security keys may include generation of the security keys, for example, the generation of secret security key $S_0$ and corresponding public security key $PK_0$. $SK_0$ can be securely provided to the DPE 20 where it is to be used and $PK_0$ can be provided to other entities within the healthcare data system, such as the data consumer 40. Public security keys contained in the KMS may be pushed out to other entities, or specific public security keys may be requested by the particular entities that require them. An alternative arrangement to the healthcare data system having a KMS is for the DPE to generate $SK_0$ and $PK_0$ itself and then provide $PK_0$ to other entities within the system, such as data consumer 40 that require $PK_0$.

FIG. 2

Figure 2:
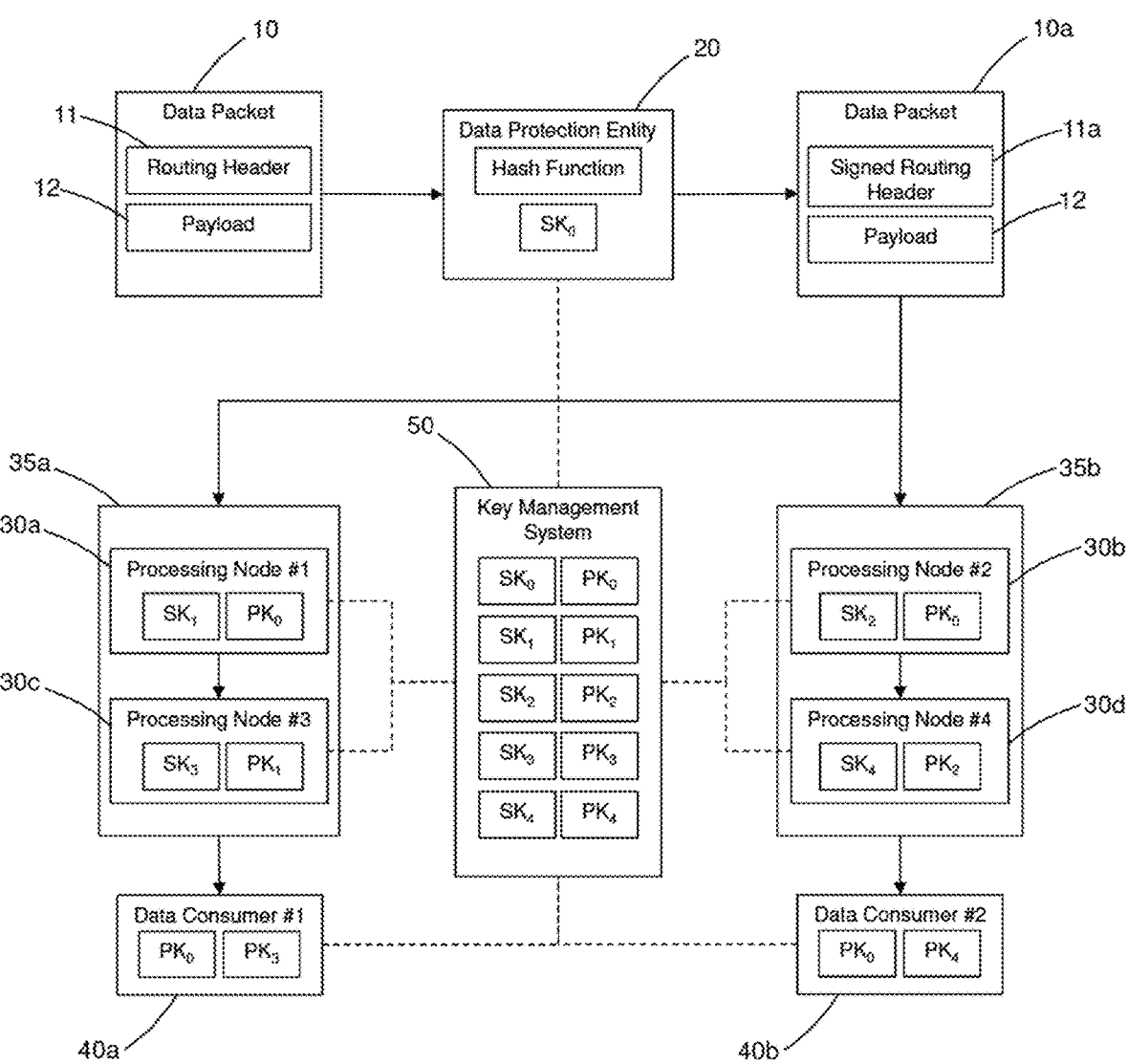
FIG. 2 is a modification of the information flow diagram of FIG. 1.

FIG. 2 is a modification of the information flow diagram of FIG. 1, illustrating another healthcare data system. Like features of the information flow diagrams of FIGS. 1 and 2 are indicated by the same reference numbers.

There are further data receivers within the healthcare data system of FIG. 2 in comparison to FIG. 1: two data consumers 40a-b and four processing nodes 30a-d are present. The processing nodes 30 are configured to carry out data processing on the data packet 10a such that it is in the required state to be consumed by the data consumers 40. This processing may include data processing on the signed routing header 11a and/or data processing on the payload 12. In order to be in the required state to be consumed by the data consumers 40, the data packet 10a may undergo processing by a sequence of processing nodes 30. In FIG. 2 the processing nodes 30 are arranged into processing pipelines 35a-b that group and sequence a given set of processing nodes 30 that the data packet 10a passes through before arriving at a given data consumer 40. Processing pipeline 35a contains processing node #1 30a and processing node #3 30c, through which the data packet 10a passes in that order before exiting the pipeline 35a and arriving at data consumer #1 40a. Processing pipeline 35b contains processing node #2 30b and processing node #4 30d, through which the data packet 10a passes in that order before exiting the pipeline 35b and arriving at data consumer #2 40b. Where the same data packet needs to be transmitted into multiple processing pipelines 30 from the DPE 20, the DPE can simply duplicate the data packet.

The healthcare data system of FIG. 2 further differs from that of FIG. 1 in that additional signing and verification of the routing header 11a occurs throughout the healthcare data system. Each processing node 30 is configured to receive a data packet 10a from a preceding entity in the system and verify the signed router heading 11a using a public key associated with that preceding entity. In the case of processing nodes #1 and #2 30a, 30b, the preceding entity in the system is the DPE 20, which has signed the routing header 11 using $SK_0$. Accordingly, processing nodes #1 and #2 30a, 30b both receive $PK_0$ from the KMS 50 and on receiving a data packet having a signed routing header 11a that purports that the data packet 10a has been transmitted from the DPS 20, use $PK_0$ to verify that the signed routing header 11a was indeed signed by DPS 20 using $SK_0$. Processing nodes 190 1 and #2 30a, 30b then sign the signed routing header 11a using their own private security keys, $SK_1$ and $SK_2$, respectively, each of which has a corresponding public security key ($PK_1$, $PK_2$) associated with it, the public keys having an asymmetric relationship with their respective private keys.

In the case of processing nodes #3 and #4, 30c, 30d, the preceding entities in the system are processing nodes #1 and #2 30a, 30b, respectively. Accordingly, processing node #3 30c receives public security key $PK_1$ from the KMS 50 and uses this on receipt of a data packet 10a containing a signed routing header 11a that purports that the data packet 10a has been transmitted from processing node #1 30a to verify that the signed routing header 11a was indeed signed by processing node #1 30a using $SK_1$. Equivalently, processing node #4 30d receives public security key $PK_2$ from the KMS 50 and uses this on receipt of a data packet 10a containing a signed routing header 11a that purports that the data packet 10a has been transmitted from processing node #2 30b to verify that the signed routing header 11a was indeed signed by processing node #2 30b using $SK_2$. Similarly to processing nodes #1 and #2 30a, 30b, processing nodes #3 and #4 30c, 30d then sign the signed routing header 11a using their own private security keys, $SK_3$ and $SK_4$, respectively, each of which has a corresponding public security key ($PK_3$, $PK_4$) associated with it, the public keys having an asymmetric relationship with their respective private keys. A data consumer 40 may also be configured to verify that the data packet 10a it receives has been transmitted from the preceding entity indicated in the signed routing header 11a. By way of example, processing node #3 30c is the preceding entity to data consumer #1 40a for data packet 10a and data consumer #1 can verify that processing node #3 signed the routing header 11a by using $PK_3$, corresponding to $SK_3$ that processing node #3 30c uses to sign the signed routing headers 11a of the data packets 10a it receives and transmits.

If one of the processing nodes 30a-d or data consumers 40a-b is unable to verify the signed routing header 11a of a data packet 10a using the public key associated with the preceding entity that the signed routing header 11a purports that data packet 10a to have been transmitted from, then the data packet 10a is discarded by the healthcare data system as having arisen from an unauthorised entity or as a result of an error in the system. No further processing, use, or transmission of the discarded data packet is made.

In this manner, data receivers (processing nodes 30 or data consumers 40) are provided with functionality to verify a chain of transmission that a given data packet 10a has passed along through the healthcare data system prior to arriving at that data receiver.

Furthermore, in addition to the chain of transmission function provided by the system in FIG. 2, the data consumers 40 are also provided with $PK_0$ from the KMS 50 such that each data consumer, as well as verifying the preceding entity that a data packet 10a has been transmitted from, can also verify that the signed routing header 110a has been signed by the DPE 20 and thus the healthcare data system 20 of FIG. 2 is also provided with the anti-repudiation functionality described in relation to FIG. 1.

A further, unrelated, feature of the system in FIG. 2 is that the DPE 20 comprises a hash function. Accordingly, the DPE 20 is configured to sign the at least a portion of the routing header 11 by computing a hash of the routing header 11 and subsequently signing this hashed router header with $SK_0$.

Figure 3:
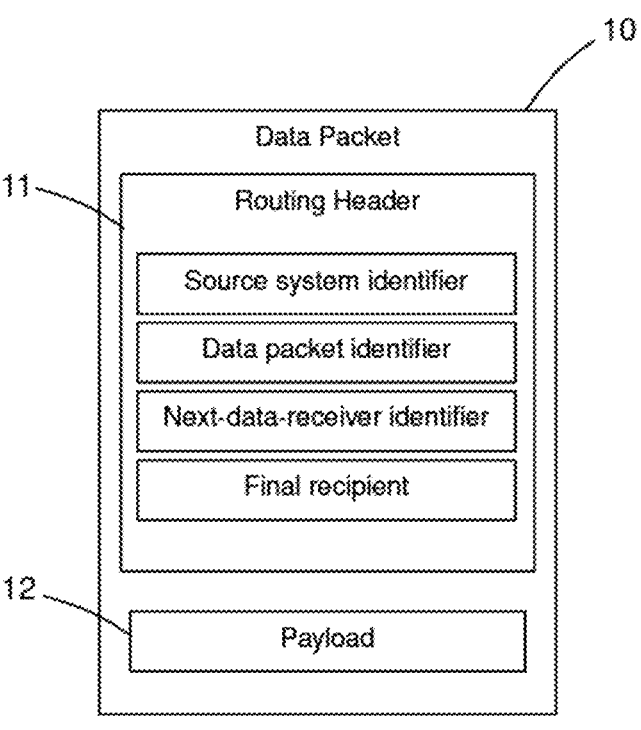
FIG. 3 illustrates the contents of a data packet.

FIG. 3

Where the system comprises a plurality of data receivers within the system, with one or more of the data receivers being a processing node 30, then the DPE 20 will not necessarily be transmitting the data packets 10a directly to the intended consumer indicated in the routing header 11a of that data packet 10a. By way of example, in FIG. 2 the data packet 10a is transmitted from the DPE 20 towards the data consumers 40 indirectly via two processing nodes 30 (processing nodes #1 and #3 30a, 30c, or processing nodes #2 and #4 30b, 30d). Accordingly, in such cases the routing header 11a will contain further information beyond that indicating an intended consumer of the data packet 10a. FIG. 3 illustrates the contents of a data packet 10. The routing header 11 of the data packet contains: a source system identifier (identifying, for example, the previous component in the chain which has modified the header), a data packet identifier, an indication of an intended consumer, and a next-data-receiver identifier. In such a case, the processing node indicated as the next-data-receiver identifier receives the data packet 10 from the DPE 20, and based on the indication of an intended consumer of the data packet 10, can determine the next data receiver that the data packet 10 should be send to. The processing node can then modify the routing header 11 to alter the next-data-receiver identifier prior to signing at least a portion of the routing header 11, typically the next-data-receiver identifier that the processing node has altered. This modification of the routing header 11 by a processing node is discussed further in relation to FIG. 4. An alternative to the routing header 11 containing an indication of an intended consumer and a next-data-receiver identifier is for the routing header 11 to contain an intended path of data receivers. Accordingly, the processing nodes may not need to modify the routing header 11 to indicate the next node, since it will already be indicated in the intended path. However, even where an intended path is present, a processing node may be configured to be able to modify the routing header 11 to alter the intended path, such that the healthcare data system is able to dynamically modify the route along which a given data packet 10 is to be transmitted to reach the intended data consumer 40.

FIG. 4

Figure 4:
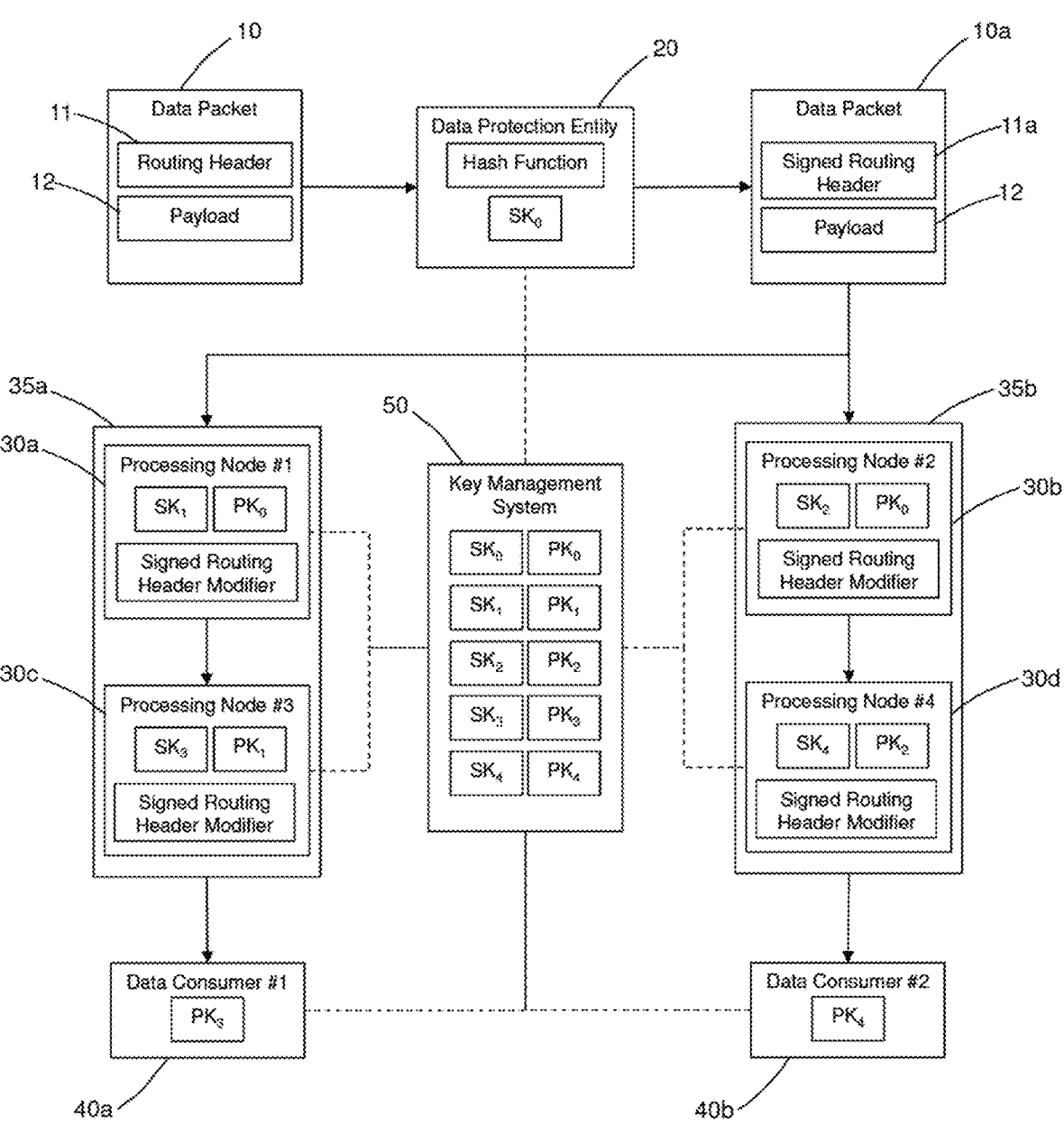
FIG. 4 is a modification of the information flow diagram of FIG. 2.

FIG. 4 is a modification of the information flow diagram of FIG. 2, illustrating another healthcare data system. Like features of the information flow diagrams of FIGS. 2 and 4 are indicated by the same reference numbers.

The system illustrated in FIG. 4 is firstly modified from the system illustrated in FIG. 2 in that the processing nodes 30a-30d each contain a signed routing header modifier. The routing header 11 in the data packet 10 provided to the DPE 20 may contain only an indication of the intended consumer (i.e. the final recipient) and an indication of the next data receiver (i.e. the data receiver the data packet 10a is to be sent to directly from the DPE 20), and not a complete path of data receivers along which to send the data packet 10a from the DPE 20 to the intended consumer 40. In such a case, the signed routing header modifier of each processing node 30 is configured to modify a portion of the signed routing header 11a to indicate a next data receiver to which the data packet 10a is to be transmitted. The processing node 30 may determine which data receiver the data packet 10a should be sent to next based on indication of the intended consumer 40 and previous data receivers indicated in the signed routing header 11a. Having modified a portion of the signed routing header 11a to indicate the next data receiver, the processing node 30 is configured to sign the modified portion of the signed routing header 11a in the same manner as discussed with reference to FIG. 2 and the signing of the signed routing header 11a by the processing nodes 30.

The ability of the processing nodes 30a-d in FIG. 4 to modify the signed routing header 11a to indicate the next data receiver to send the data packet 10a to facilitates the dynamic modification of the route along which a given data packet 10a is to be transmitted to reach the intended data consumer 40. This allows the healthcare data system to adjust routes based on the performance of the different processing nodes 30, whilst still providing the anti-repudiation functionality and chain-of-transmission verification functionality discussed in relation to FIGS. 1 and 2, respectively.

A further modification of the system illustrated in FIG. 4 is that the data consumers 40a-b are not provided with $PK_0$ and do not directly verify that the signed routing header 11a of a data packet $10a$ has been signed by the DPE $20$. In such a case, it is nevertheless implicit that the data packet $10a$ was transmitted from the DPE $20$. Taking data consumer #1 as an example: data consumer #1 $40a$ can verify that the signed routing header $11a$ has been signed by processing node #3 $30c$ using $PK_3$, because processing node #3 $30c$ is the preceding entity to data consumer #1 $40a$ and will have signed the routing header $11a$ with $SK_3$; processing node #3 $30c$ will only have signed the routing header $11a$ if processing node #3 $30c$ has verified that processing node #1 $30a$, the preceding entity to processing node #3 $30c$, signed the routing header $11a$ (which processing node #3 $30c$ verifies with $PK_1$); processing node #1 $30a$ will only have signed the routing header $11a$ if processing node #1 $30a$ has verified that the DPE $20$, the preceding entity to processing node #1 $30a$, signed the routing header $11$ (which processing node #1 $30a$ verifies with $PK_0$); thus, the verified signing of the signed routing header $11a$ by processing node #3 $30c$ allows data consumer #1 $40a$ to infer that the DPE $20$ signed the routing header $11$ without data consumer #1 $40a$ being provided with $PK_0$ that corresponds to $SK_0$ used by the DPE $20$ to sign the routing header $11$.

Figure 5:
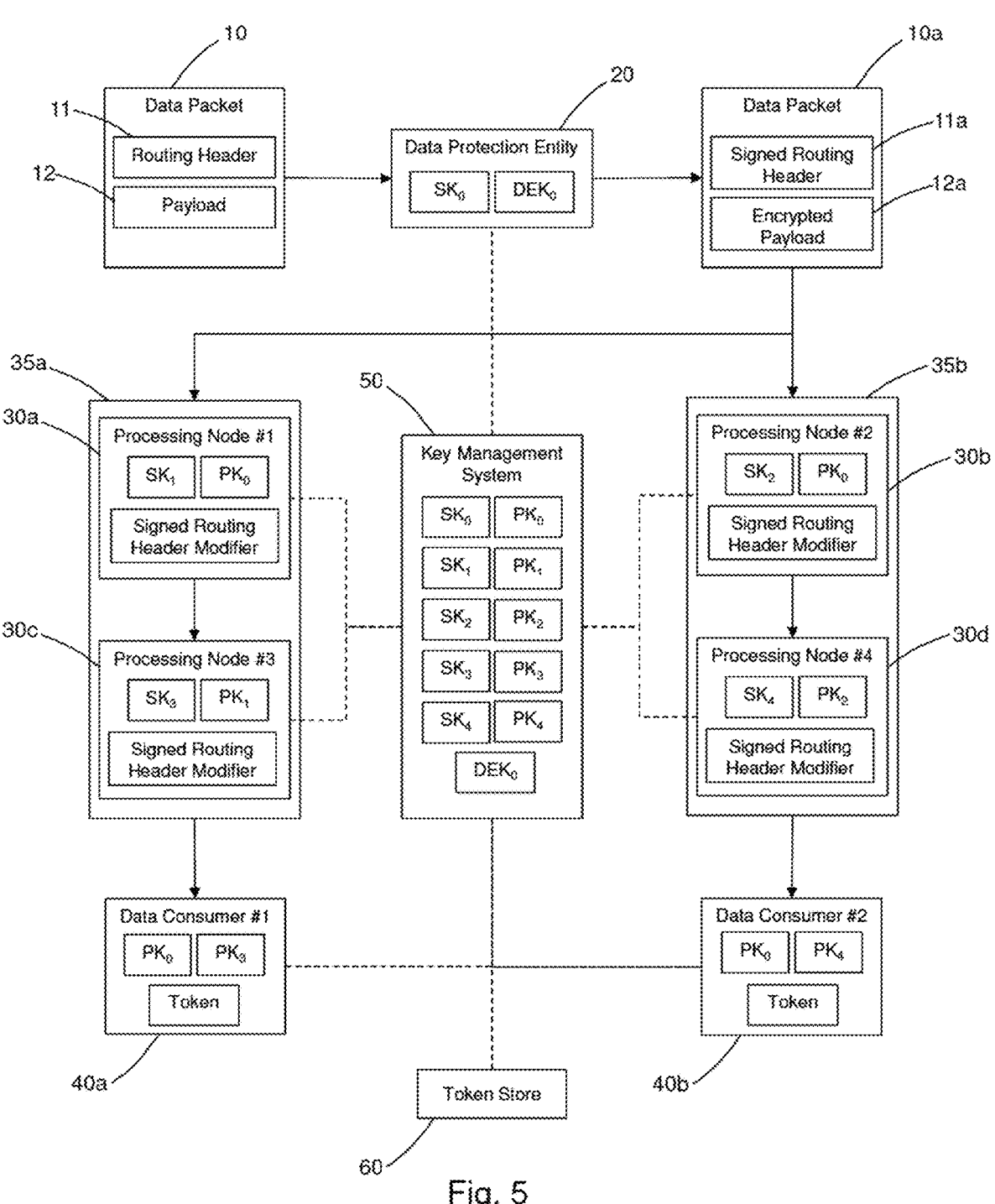
FIG. 5 is a modification of the information flow diagram of FIG. 4.
Figure 6:
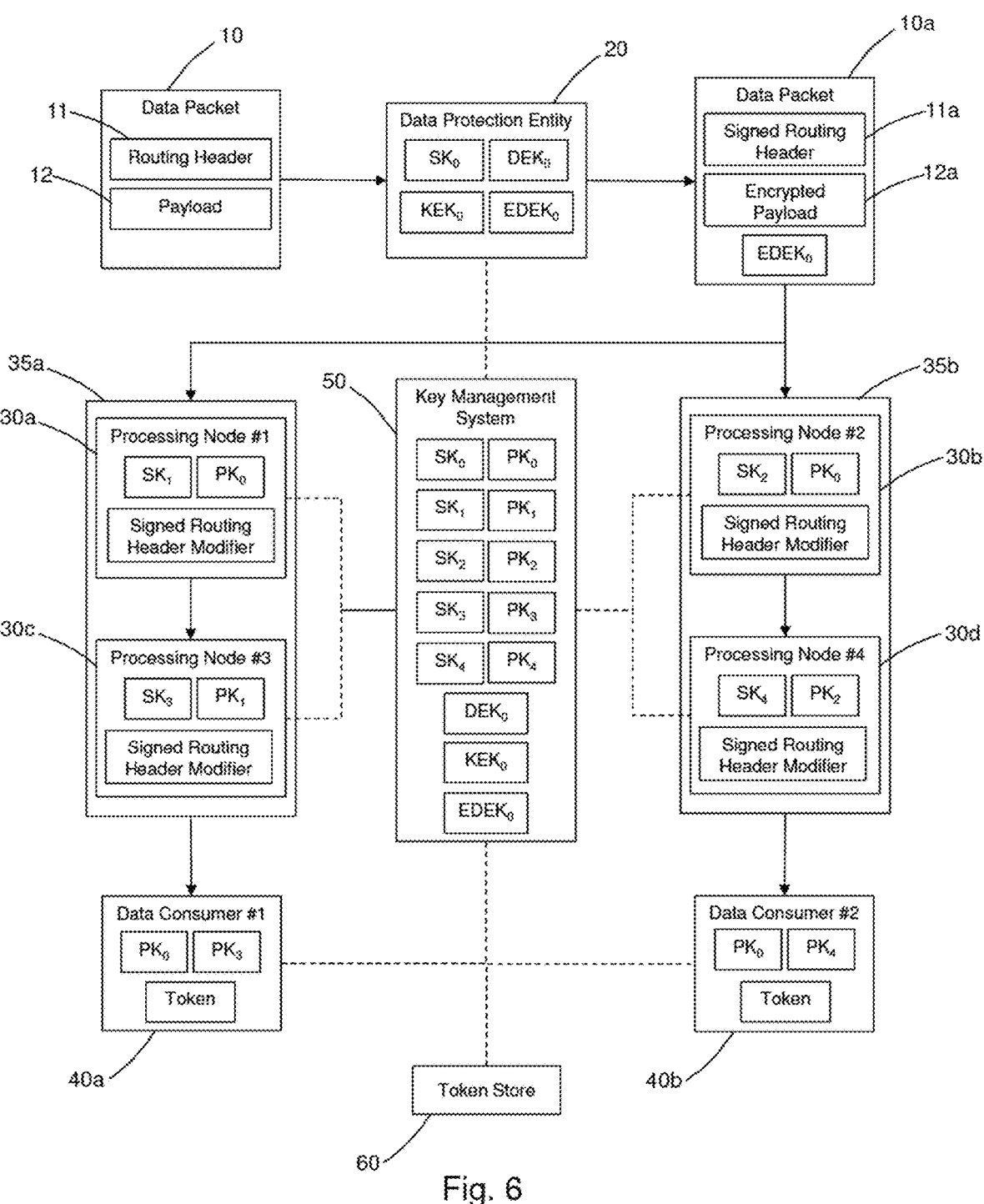
FIG. 6 is a modification of the information flow diagram of FIG. 5.

FIGS. 5 and 6

A data packet $10$ can contain a payload $12$ of healthcare data that requires encryption prior to transmission through the healthcare data system to ensure that data contained within the payload $12$ cannot be intercepted and understood by a malicious entity. However, in such a case the data consumer $40$ typically needs to be able to decrypt the healthcare data in the payload $12$ such that the data consumer $40$ can use the data. In other words, the payload may require end-to-end encryption. FIGS. 5 and 6 illustrate two healthcare data systems in which a payload $12$ of a data packet $10$ can be end-to-end encrypted between the DPE $20$ and the data consumers $40$.

FIG. 5 is a modification of the information flow diagram of FIG. 4, illustrating a healthcare data system in which a payload $12$ of a data packet $10$ can be encrypted prior to transmission to data receivers and then decrypted by the intended consumer $40$ of that data packet $10$. Like features of the information flow diagrams of FIGS. 4 and 5 are indicated by the same reference numbers.

The DPE $20$ in FIG. 5 contains a date encryption key ($DEK_0$) that the DPE $20$ is configured to use to encrypt the payload $12$, with the data packet $10a$ received by processing nodes #1 and #2 $30a$, $30b$ containing an encrypted payload $12a$. The $DEK_0$ is cleared from the memory of the DPE $20$ after use. The keys for encryption and decryption of the payload $12$ are symmetrical, such that the $DEK_0$ can be used to decrypt the encrypted payload $12a$. The $DEK_0$ may be generated by the KMS $50$.

The data packet $10a$ containing the encrypted payload $12a$ is transmitted along the pipelines $35a$, $35b$ via the respective processing nodes $30$. Where the payload is encrypted, the processing conducted by a given processing node $30$ may not relate to the encrypted payload $12a$, in which case it may not be required to decrypt the payload $12a$ at the processing nodes $30$. Where the processing does relate to the encrypted payload $12a$, the processing node $30$ may be configured to conduct the processing on the encrypted payload $12a$, or the processing node $30$ may be configured to decrypt the encrypted payload $12a$, conduct the processing and subsequently re-encrypt the payload.

The encrypted payload $12a$, on reaching a data consumer $40$ as part of the data packet $10a$, requires decryption in order to be used by the data consumer $40$. In order to allow a given data consumer $40$ to decrypt the payload $12a$, the data consumer must be provided with $DEK_0$ from the KMS $50$. In order to provide a system that is secure against attempted access to encrypted payloads $12a$ by unauthorised entities, the KMS $50$ is provided with a means by which to assess whether the entity requesting $DEK_0$ is authorised to receive it. This assessment is conducted using a token authentication system. The system in FIG. 5 further comprises a token store $60$, which is in communication with the data consumers $40$ within the system and the KMS $50$ such that the token store $60$ is able to issue tokens to the data consumers $40$, and such that the tokens will be recognised by the KMS $50$. The token store $60$ comprises a separate namespace partition for each data receiver and for the DPE $20$. The KMS tokens for specific security keys are stored in the related namespace partition. In examples where the data receivers are running as containers (for example in a Kubernetes environment), the tokens are deployed from the token store $40$ according to sidecar injection. For example, the KMS $50$ can have access to: the access key, and the secret access key. These credentials can be stored in the token store $60$ (which may be referred to as Vault) and deployed at the edge container (for example in a Kubernetes environment) at runtime, so that they are only available in volatile memory. This would appear as a folder to the container. The edge container can use these credentials to access the KMS and retrieve the private key to sign.

A data consumer $40$, having received a token and a data packet $10a$ with an encrypted payload $12a$, is configured to present the token to the KMS $50$, the KMS $50$ being configured to then supply said data consumer $40$ with the $DEK_0$, such that the payload $12a$ can be decrypted.

Typically, where a token is stored within the data consumer $40$, it is only stored in volatile memory of that data consumer $40$. Storage in volatile memory enhances the security of the system because the token is only retained by the data consumer's storage $40$ as long as the data consumer $40$ is receiving power.

Although the processing nodes $30$ in FIG. 5 contain signed routing header modifiers, it is not necessary for the processing nodes $30$ to contain these for the features of encrypting and decrypting the payload $12$ to be present in the system.

FIG. 6 is a modification of the information flow diagram of FIG. 5, illustrating another healthcare data system in which a payload $12$ of a data packet $10$ can be encrypted prior to transmission to data receivers and then decrypted by the intended consumer $40$ of that data packet $10$.

As in the system of FIG. 5, the payload $12$ of the data packet $10$ is encrypted by the DPE $20$ using a data encryption key ($DEK_0$). $DEK_0$ is itself encrypted by the DPE $20$ using a key encryption key ($KEK_0$) to generate an encrypted data encryption key ($EDEK_0$). Both the encrypted payload $12a$ and $EDEK_0$ are then included in the data packet $10a$ that is transmitted to the data consumers $40a$, $40b$ via the processing nodes $30a\text{-}d$. The keys for encryption and decryption of the payload $12$ are symmetrical, such that the $DEK_0$ can then be used to decrypt the encrypted payload $12a$. Similarly, the keys for encryption and decryption of the payload are symmetrical, such that the $KEK_0$ can be used to decrypt the $EDEK_0$ to provide the $DEK_0$ The data packet $10a$ containing the encrypted payload $12a$ is transmitted along the pipelines $35a$, $35b$ via the respective processing nodes $30$. Where the payload is encrypted, the processing conducted by a given processing node $30$ may not relate to the encrypted payload $12a$, in which case it may not be required to decrypt the payload $12a$ at the processing nodes $30$. Where the processing does relate to the encrypted payload $12a$, the processing node 30 may be configured to conduct the processing on the encrypted payload $12a$, or the processing node 30 may be configured to decrypt the encrypted payload $12a$, conduct the processing and subsequently re-encrypt the payload. The processing node 30 may be configured to re-encrypt the payload using a private key associated with the processing node 30 and encrypt this private key using $KEK_0$ and include the encrypted private key of the processing node 30 in the data packet $10a$.

As in the system of FIG. 5, the system includes a token store 60 that is in communication with the data consumers 40 within the system and the KMS 50 such that the token store is able to issue tokens to the data consumers, and such that the tokens will be recognised by the KMS 50. A data consumer 40, having received a token and a data packet $10a$ containing an encrypted payload $12a$ and $EDEK_0$, is configured to present the token to the KMS 50, the KMS 50 being configured to then supply said data consumer 40 with the $KEK_0$ such that the data consumer can use $KEK_0$ to decrypt $EDEK_0$ to obtain $DEK_0$, which it can then use to decrypt the payload $12a$ for use. As with the system of FIG. 5, such tokens are typically stored within the data consumers 40 only within their volatile memory. Where the payload $12a$ has been encrypted with a private key associated with a processing node 30, the data consumer 40 can use $KEK_0$ to decrypt the encrypted private key of the processing node 30 included in the data packet $10a$ by the processing node 30, and subsequently use that decrypted private key to decrypt the payload $12a$.

A data consumer 40 entitled to decrypt a given payload $10a$ may provide the KMS 50 with a public key corresponding to a private key held by that data consumer 40 when requesting $KEK_0$ from the KMS 50. Accordingly, the KMS 50 can encrypt $KEK_0$ using that public key before supplying it to the data consumer 40. That data consumer 40 can then decrypt $KEK_0$ using its corresponding private key. The public key of the data consumer 40 can be shared with the KMS 50 using X.509 certificates.

FIG. 7

Figure 7:
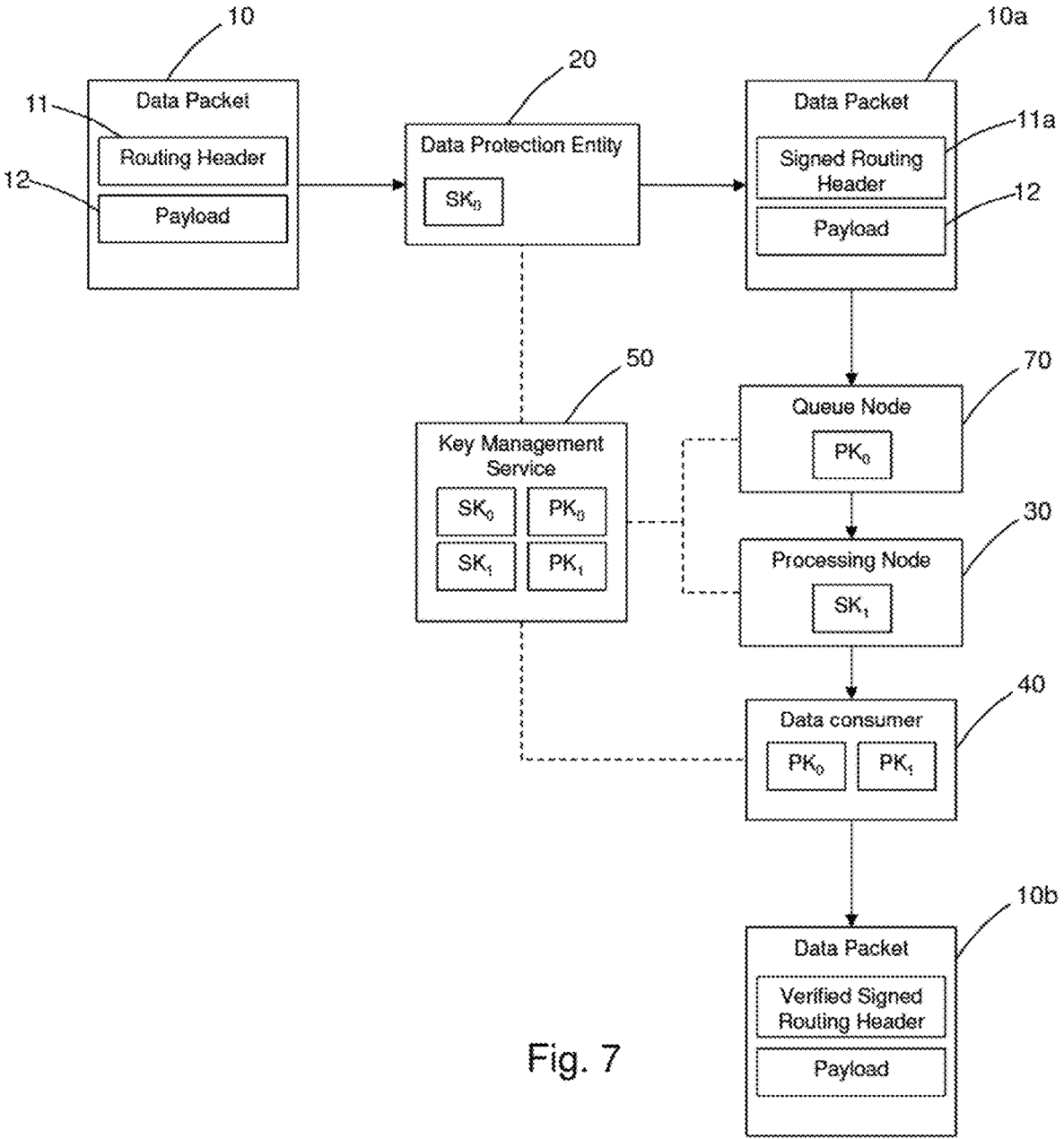
FIG. 7 is a modification of the information flow diagram of FIG. 1.

FIG. 7 is a modification of the information flow diagram of FIG. 1, illustrating another healthcare data system. Like features of the information flow diagrams of FIGS. 1 and 7 are indicated by the same reference numbers.

There are two further data receivers in the healthcare data system of FIG. 7 in comparison to the system of FIG. 1: a queue node 70 and a processing node 30. A data packet $10a$ having the data consumer 40 as its intended consumer is transmitted toward the data consumer 40 via the queue node 70 and the processing node 30.

As with the processing nodes 30 described in relation to FIGS. 2, 3, 5 and 6, the processing node 30 in FIG. 7 is configured to carry out data processing on the data packet $10a$ such that it is in the required state to be consumed by the data consumers 40. This processing may include data processing on the signed routing header $11a$ and/or data processing on the payload 12.

In the healthcare data systems illustrated by FIGS. 2, 3, 5 and 6, where the healthcare data system is handling a plurality of data packets $10a$ and a given data packet $10a$ is transmitted from one entity (the DPE 20 or a preceding processing node 30) to a processing node 30 that is already occupied with processing another data packet $10a$, the given data packet $10a$ may join a queue for that processing node 30. The processing node 30 will work through the queue of data packets $10a$, first verifying the signed routing header $11a$ of a data packet $10a$, then carrying out processing on that data packet $10a$ (providing the verification is successful), and possibly modifying a portion of the signed routing header $11a$ and signing the modified portion of the signed routing header $11a$, before transmitting that data packet $10a$ to the following data receiver, then moving onto the next data packet in the queue and so on.

However, there is the possibility to improve the efficiency of such a system, since there may be data packets $10a$ in the queue for a processing node 30 that will fail the verification step (i.e. invalid data packets) and will not be undergo further processing by the processing node 30 after failing the verification step. These invalid data packets $10a$ nevertheless occupy processing capacity of the processing node during the verification step and therefore delay the processing of other, potentially valid, data packets within the queue, because the processing node 30 is not configured to conduct verification of one data packet $10a$ and data processing of another data packet $10a$ in parallel—the processing node 30 may become a bottleneck within the healthcare data system.

Accordingly, in FIG. 7, the processing node 30 has a queue node 70 proceeding it. Any data packets $10a$ for processing by the processing node 30 are first received by the queue node. The queue node receives $PK_0$ from the KMS 50, and accordingly, the queue node is able to verify the signed routing headers $11a$ of any data packets $10a$ purporting to be transmitted from the DPE 20 that are queued for the processing node 30 in parallel with the processing node 30 carrying out data processing on verified data packets $10a$. The queue node 70 is able to discard any queued data packets $10a$ that purport to be transmitted from the DPE 20 whose signed routing headers $11a$ are unable to be verified using $PK_0$. This then means that any data packets $10a$ received by the processing node 30 from the queue node 70 have already been verified and accordingly their signed routing headers $11a$ do not require verification by the processing node 30. Verification of the signed routing header $11a$ is typically a faster operation than the data processing of the data packet $11a$ by the processing node 30, meaning that the queue node 70 cannot become a bottleneck within the healthcare data system. Accordingly, processing capacity of the processing node 30 is not occupied by verification of invalid data packets 30 and throughput of data packets $10a$ through the processing node 30 can be increased.

Queue nodes 70 may also be incorporated into the healthcare data systems illustrated in FIGS. 2, 3, 5 and 6 for one or more of the processing nodes.

Figure 8:
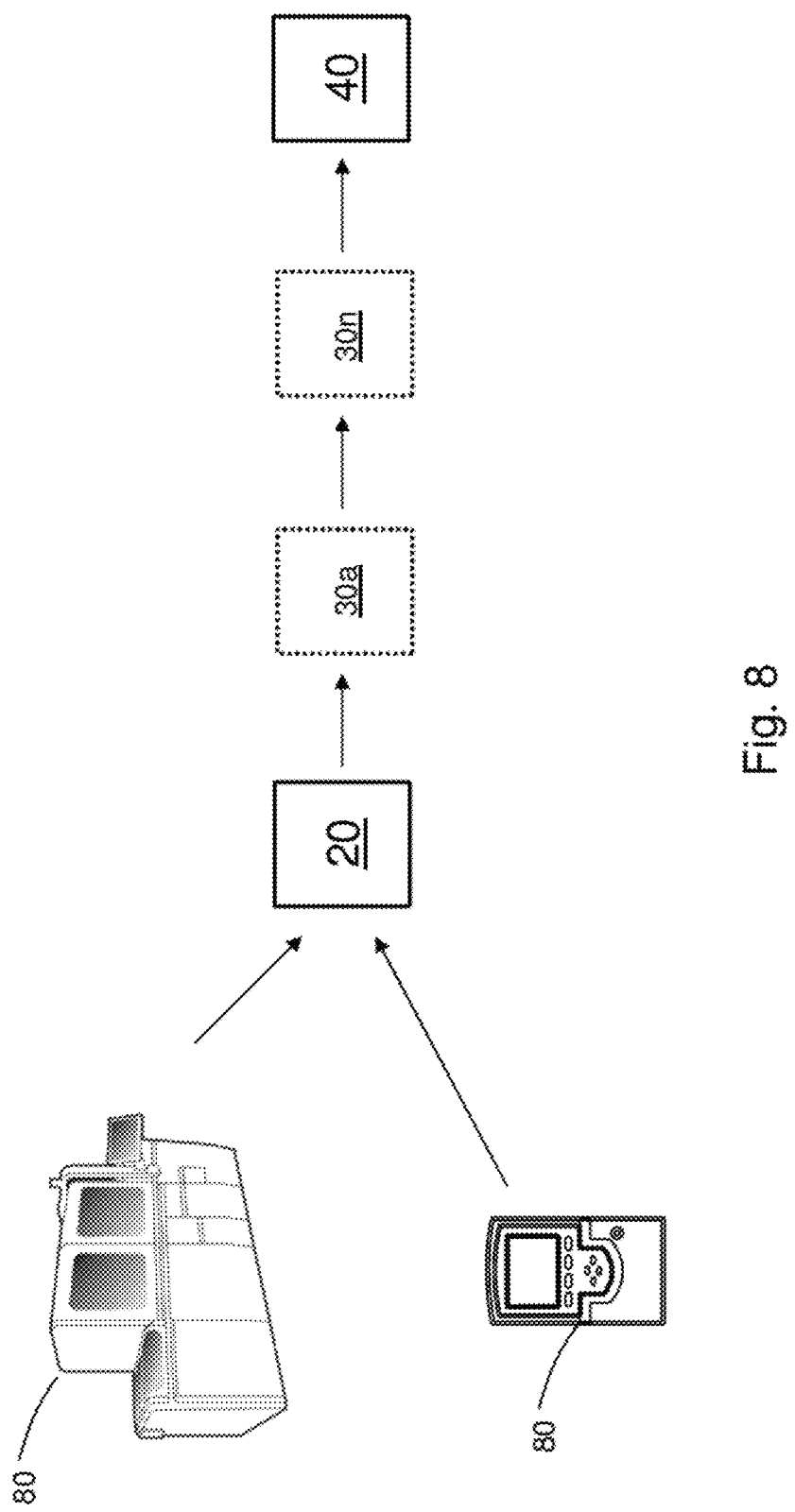
FIG. 8 is a diagram showing a healthcare data system including a data source.

FIG. 8 is a diagram showing a healthcare data system including data source(s) 80. In this example there are two data sources, one which is a laboratory based in-vitro diagnostic instrument and the other of which is a point-of-care in-vitro diagnostic instrument. Additional data sources could include in-vivo measurement instruments. For example, heart rate and oxygen saturation data from a pulse oximeter, or other instruments used in a clinical setting (e.g. an ICU instrument). The data sources could also be healthcare related data banks, for example electronic medical records (EMRs) which contain patient data such as patient age, or existence of a symptom as determined by a clinician. The data sources provide their data (in the form of data payloads) to the data protection entity 20. The data protection entity then prepares a data packet $10a$ of the type discussed previously, including a signed routing header $11a$. The data packet is then provided through each of n processing nodes (where n can equal 1, or any integer higher than 1). Ultimately the data packet is received by data consumer 40.

The terms "signature" and "sign" as used herein encompass digital signature and digital signing, respectively. Typically, the signature The term "data packet" as used herein encompasses messages and derived events within the healthcare data system.

The term 'laboratory instrument' as used herein encompasses any apparatus or apparatus component operable to execute one or more processing steps/workflow steps on one or more biological samples and/or one or more reagents. The term 'instrument' covers pre-analytical instruments, post-analytical instruments and also analytical instruments.

The term 'analyzer'/'analytical instrument' as used herein encompasses any apparatus or apparatus component configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectrometry of proteins or metabolites and physical or chemical parameters of various types. An analytical instrument may comprise units assisting with the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzers are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The term 'pre-analytical instrument' as used herein encompasses any apparatus or apparatus component that is configured to perform one or more pre-analytical workflow steps comprising—but not limited to—centrifugation, resuspension (e.g. by mixing or vortexing), capping, decapping, recapping, sorting, tube type identification, sample quality determination and/or aliquotation steps. Said steps may also comprise adding chemicals or buffers to a sample, concentrating a sample, incubating a sample, and the like.

The term 'post-analytical instrument' as used herein encompasses any apparatus or apparatus component that is configured to perform one or more post-analytical workflow steps comprising—but not limited to—sample unloading, transport, recapping, decapping, temporary storage/buffering, archiving (refrigerated or not), retrieval and/or disposal.

The term 'point-of-care device' as used herein encompasses any analyzer used in a point-of-care environment, such as (but not limited to) blood glucose testing, coagulation testing, blood gas and electrolytes analysis, urinalysis, cardiac markers analysis, hemoglobin diagnostics, infectious disease testing, cholesterol screening or nucleic acid testing NAT. Results may be viewed directly on the POC analyzer/device(s) or may be sent to and displayed in a healthcare information management system.

The term 'healthcare data' as used herein encompasses any data obtained from one or more medical devices through operation of such a device on one or more patients, or one or more samples obtained therefrom.

The term 'connected' as used herein encompasses both direct and indirect communication pathways between two or more elements. A communications pathway may be provided through a physical entity such as a wired connection or may be provided through a non-physical communication system such as a network.

The systems and methods of the above embodiments may be implemented in a computer system (in particular in computer hardware or in computer software) in addition to the structural components and user interactions described.

The term 'computer system' includes the hardware, software and data storage devices for embodying a system or carrying out a method according to the above described embodiments. For example, a computer system may comprise a central processing unit (CPU), input means, output means and data storage. The computer system may have a monitor to provide a visual output display. The data storage may comprise RAM, disk drives or other computer readable media. The computer system may include a plurality of computing devices connected by a network and able to communicate with each other over that network, and in such instances may be referred to as a computer network.

The methods of the above embodiments may be provided as computer programs or as computer program products or computer readable media carrying a computer program which is arranged, when run on a computer, to perform the method(s) described above.

The term 'computer readable media' includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

In particular, although the methods of the above embodiments have been described as being implemented on the systems of the embodiments described, the methods and systems of the present disclosure need not be implemented in conjunction with each other, but can be implemented on alternative systems or using alternative methods respectively.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCE NUMERALS 10, 10a-c Data packet
11, 11a Routing header
12, 12a Payload
20 Data protection entity
30, 30a-d Processing node
35a-b Processing pipeline
40, 40a-b Data consumer
50 Key Management Service
60 Token Store
70 Queue node
80 Data

The invention claimed is:

1. A healthcare data system, comprising:
a data protection entity, configured to:
    sign at least a portion of a routing header of a data packet with a first private key held by the data protection entity, the data packet including a payload and a routing header, the payload including healthcare data and the routing header indicating an intended consumer of the data packet; and
    transmit the data packet over a computer network along a route towards the intended consumer; and
a processing node configured to:
    receive the transmitted data packet along the route toward the intended consumer;
    verify that the signed routing header was signed by the data protection entity;
    sign at least a portion of the routing header with a second private key held by the processing node, wherein the second private key is different from the first private key; and
    transmit the data packet over the computer network toward the intended consumer.

2. The healthcare data system of claim 1, wherein the intended consumer is configured to verify the signed routing header using a first public key associated with the first private key held by the data protection entity, and a second public key associated with the second private key held by the processing node.

3. The healthcare data system of claim 1, wherein the processing node is further configured to:
    modify a portion of the signed routing header, to indicate a next processing node to which the data packet is to be transmitted.

4. The healthcare data system of claim 1, wherein the signed routing header indicates an intended path through one or more processing nodes.

5. The healthcare data system of claim 1, wherein the data protection entity is connected to one or more of a laboratory middleware, laboratory information system, or laboratory information management system.

6. The healthcare data system of claim 1, wherein the signed routing header includes at least one of: a source system identifier, a data packet identifier, or a final recipient.

7. The healthcare data system of claim 1, further including a key management service, separate from the data protection entity, and configured to manage one or more security keys.

8. The healthcare data system of claim 7, wherein the data protection entity is further configured to encrypt the payload of the data packet using a data encryption key.

9. The healthcare data system of claim 8, wherein:
    a decryption key is configured to decrypt the encrypted payload and held by the key management service; and
    wherein the decryption key is accessible by the data consumer upon presentation of a token to the key management service.

10. The healthcare data system of claim 9, wherein the intended consumer is configured to restrict storage of the token to volatile memory.

11. The healthcare data system of claim 1, wherein data protection entity is configured to sign the at least a portion of the routing header by providing the routing header to a one-way function.

12. A computer-implemented healthcare data management system comprising a data protection entity and at least one intermediate processing node, connectable within a computer network to a data source and a data consumer, the healthcare data management system being configured to:
    receive, from the data source, a data packet including a payload;
    determine a routing header, the routing header indicating the data consumer of the data packet;
    sign, by the data protection entity, at least a portion of the routing header with a first private key held by the data protection entity;
    transmit the data packet along a route toward the data consumer;
    receive, by an intermediate processing node of the healthcare data management system, the data packet transmitted by the data protection entity along the route toward the data consumer;
    verify, by the intermediate processing node, that the signed routing header was signed by the data protection entity;
    sign, by the intermediate processing node, at least a portion of the routing header with a second private key held by the intermediate processing node, wherein the second private key is different from the first private key; and
    transmit, by the intermediate processing node, the data packet over the computer network along the route toward the data consumer.

13. A computer-implemented method comprising steps of:
    receiving, by a data protection entity, a data packet including a payload and a routing header, the payload including healthcare data and the routing header indicating an intended data consumer of the data packet;

signing, by the data protection entity, at least a portion of the routing header with a first private key held by the data protection entity;

transmitting, by the data protection entity, the data packet to an intermediate processing node;

receiving, by the intermediate processing node, the data packet;

verifying, by the intermediate processing node, that the signed routing header was signed by the data protection entity;

signing, by the intermediate processing node, at least a portion of the routing header with a second private key held by the intermediate processing node, wherein the second private key is different from the first private key; and transmitting, by the intermediate processing node, the data packet along a route toward the intended data consumer.

14. The method of claim 13, wherein the intended data consumer is configured to verify the signed routing header using a first public key associated with the first private key held by the data protection entity, and a second public key associated with the second private key held by the intermediate processing node.

15. The method of claim 13, wherein the intermediate processing node is configured to:

modify a portion of the signed routing header, to indicate a next processing node to which the data packet is to be transmitted.

16. The method of claim 13, wherein the signed routing header indicates an intended path through one or more processing nodes.

17. The method of claim 13, wherein the data protection entity is connected to one or more of a laboratory middleware, laboratory information system, or laboratory information management system.

18. The method of claim 13, wherein the signed routing header includes at least one of: a source system identifier, a data packet identifier, or a final recipient.

19. The method of claim 13, wherein the intermediate processing node is further configured to:

modify the signed routing header, after verifying that the signed routing header was signed by the data protection entity, into a modified signed routing header not associated with the first private key.

20. The method of claim 13, wherein the intermediate processing node comprises a queue node and a data processing node separate from the queue node, and wherein the queue node performs the verifying that the signed routing header was signed by the data protection entity, in parallel with the data processing node performing data processing operations on a second data packet previously verified by the queue node.

* * * * *